(12) United States Patent
Ijeri et al.

(10) Patent No.: US 11,987,669 B2
(45) Date of Patent: May 21, 2024

(54) POLYANILINE COMPOSITIONS, ARTICLES THEREOF, AND METHODS THEREOF

(71) Applicant: THE BOEING COMPANY, Chicago, IL (US)

(72) Inventors: Vijaykumar Ijeri, Mumbai (IN); Stephen P. Gaydos, St. Louis, MO (US); Patrick J. Kinlen, Fenton, MO (US)

(73) Assignee: THE BOEING COMPANY, Arlington, VA (US)

( * ) Notice: Subject to any disclaimer, the term of this patent is extended or adjusted under 35 U.S.C. 154(b) by 126 days.

(21) Appl. No.: 17/407,850

(22) Filed: Aug. 20, 2021

(65) Prior Publication Data

US 2022/0112336 A1   Apr. 14, 2022

Related U.S. Application Data

(60) Provisional application No. 63/089,439, filed on Oct. 8, 2020.

(51) Int. Cl.
   *C08G 73/02*   (2006.01)
   *C08G 59/24*   (2006.01)
   (Continued)

(52) U.S. Cl.
   CPC ....... *C08G 73/0266* (2013.01); *C08G 59/245* (2013.01); *C08G 59/44* (2013.01);
   (Continued)

(58) Field of Classification Search
   None
   See application file for complete search history.

(56) References Cited

U.S. PATENT DOCUMENTS 7,033,639 B2   4/2006  Kelly et al.
8,546,495 B2  10/2013  Takada et al.
(Continued)

FOREIGN PATENT DOCUMENTS

CA    2011189 C    10/2000
CN    1127482 A     7/1996
(Continued)

OTHER PUBLICATIONS

Huntsman Technical Datasheet, "Araldite PZ 3961-1 Epoxy resin," pp. 1-5, (2013) (Year: 2013).*
(Continued)

*Primary Examiner* — Randy P Gulakowski
*Assistant Examiner* — Ha S Nguyen
(74) *Attorney, Agent, or Firm* — Patterson + Sheridan, LLP

(57) ABSTRACT

The present disclosure provides compositions, articles thereof, and methods of forming compositions. In at least one aspect, a composition includes (1) an epoxy, (2) an amino or amido hardener, (3) a polyaniline, (4) a dopant selected from a triazolyl, a thiazolyl, a quinolinyl, a salicylate, a benzoate, a glycolate, a phosphate, a sulfonate, an oxalate, or combination(s) thereof; and (5) a pigment selected from titanium dioxide, silica, talc, mica, aluminium stearate, or combination(s) thereof. The polyaniline+dopant comprises greater than 6 wt %, by weight of the composition. In at least one aspect, a method includes introducing an acid form of a polyaniline to a hydroxide to form a polyaniline hydroxide. The method includes introducing a dopant to the polyaniline hydroxide to form a doped polyaniline.

30 Claims, 2 Drawing Sheets

(51) Int. Cl.

| | | |
|---|---|---|
| C08G 59/44 | (2006.01) | |
| C08G 59/50 | (2006.01) | |
| C08K 3/22 | (2006.01) | |
| C08K 3/32 | (2006.01) | |
| C08K 3/36 | (2006.01) | |
| C08K 5/098 | (2006.01) | |
| C08K 5/3437 | (2006.01) | |
| C08K 5/3472 | (2006.01) | |
| C08K 5/378 | (2006.01) | |
| C08K 5/42 | (2006.01) | |
| C08K 5/47 | (2006.01) | |
| C09D 5/24 | (2006.01) | |

(52) U.S. Cl.
CPC ............... *C08G 59/50* (2013.01); *C08K 3/22* (2013.01); *C08K 3/32* (2013.01); *C08K 3/36* (2013.01); *C08K 5/098* (2013.01); *C08K 5/3437* (2013.01); *C08K 5/3472* (2013.01); *C08K 5/378* (2013.01); *C08K 5/42* (2013.01); *C08K 5/47* (2013.01); *C08G 2150/00* (2013.01); *C08K 2003/2241* (2013.01); *C08K 2003/329* (2013.01); *C09D 5/24* (2013.01)

(56) References Cited

U.S. PATENT DOCUMENTS

| | | | |
|---|---|---|---|
| 9,028,920 B2 | 5/2015 | Schimpff et al. | |
| 2004/0005464 A1 | 1/2004 | Ha et al. | |
| 2004/0035498 A1* | 2/2004 | Kinlen | C08F 2/46 |
| | | | 148/250 |
| 2015/0240378 A1 | 8/2015 | Kinlen et al. | |
| 2016/0090486 A1 | 3/2016 | Kinlen et al. | |
| 2018/0057722 A1* | 3/2018 | Callahan | B05D 1/005 |
| 2018/0362777 A1* | 12/2018 | Surwade | C09D 163/00 |

FOREIGN PATENT DOCUMENTS

| | | | |
|---|---|---|---|
| CN | 1432033 A | | 7/2003 |
| CN | 103555137 A | * | 2/2014 |
| CN | 103865361 A | | 6/2014 |
| CN | 105368304 A | * | 3/2016 |
| EP | 2669315 A1 | | 12/2013 |
| JP | 2004277521 A | * | 10/2004 |
| WO | 03102034 A1 | | 12/2003 |

OTHER PUBLICATIONS

Huntsman Technical Datasheet, "Aradur 3986 Epoxy curing agent," pp. 1-3, (2013) (Year: 2013).*

Hao Yongsheng et al: "Self-healing effect of graphene@PANI loaded with benzotriazole for carbon steel," Corrosion Science, Oxford, GB, vol. 163, dated Nov. 1, 2019 XP085978427 [Abstract Only].

PCT, Notification of Transmittal of The International Search Report and The Written Opinion of The International Searching Authority, or The Declaration of Application PCT/US2021/053323 dated Mar. 31, 2022.

Goncalves et al, "Alkyd coatings containing polyanilines for corrosion protection of mild steel" Synthetic Metals 161 (2011) 313-323.

Indumathi et al, "Cadmium and Chromate free coating schemes for corrosion protection of 15CDV6 steel" Metal Finishing, Apr./May 2011 15-21.

Dominis et al., "Comparison of polyaniline primers prepared with different dopants for corrosion protection of steel" Progress in Organic Coatings 48 (2003) 43-49.

Grgur et al, "Corrosion of mild steel with composite polyaniline coatings using different formulations" Progress in Organic Coatings 79 (2015) 17-24.

Wessling et al, "Corrosion prevention with an organic metal (polyaniline): corrosion test results" Electrochimica Acta 44 (1999) 2139-2147.

Armelin et al, "Corrosion protection with polyaniline and polypyrrole as anticorrosive additives for epoxy paint" Corrosion Science 50 (2008) 721-728.

Sathiyanarayanan et al, "Corrosion protection of steel by polyaniline (PANI) pigmented paint coating" Progress in Organic Coatings 53(2005) 297-301.

Siva et al, "Epoxy curing by polyaniline (PANI)—Characterization and self-healing evaluation" Progress in Organic Coatings 77 (2014) 1095-1103.

Samui et al., "Study of polyaniline containing paint for corrosion prevention" Progress in Organic Coatings 47 (2003) 1-7.

Armelin et al, "Anticorrosion performances of epoxy coatings modified with polyaniline: A comparison between the emeraldine base and salt forms" Progress in Organic Coatings 65 (2009) 88-93.

Gupta et al, "Polyaniline-lignosulfonate/epoxy coating for corrosion protection of AA2024-T3" Corrosion Science 67 (2013) 256-267.

Sathiyanarayanan et al, "Corrosion protection of steel by polyaniline blended coating" Electrochimica Acta 51 (2006) 6313-6319.

Osha, Hexavalent Chromium, Safety and Health Topics, pulled from web Sep. 1, 2021, pp. 1-5.

Echa, "Addressing Chemicals of Concern," European Chemicals Agency Annankatu 18, pulled from website Sep. 1, 2021, pp. 1-2.

Kinlen P J et al: "Emulsion Polymerization Process for Organically Soluble and Electrically Conducting Polyaniline," Macromolecules, American Chemical Society, US, vol. 31, No. 6, Mar. 24, 1998, pp. 1735-1744.

PCT, Notification of Transmittal of The International Search Report and The Written Opinion of The International Searching Authority, or The Declaration for Application PCT/US2021/053327 dated Feb. 7, 2022.

Chinese Office Action dtd Feb. 28, 2024 for Application No. 202180068865.X.

Chinese Search Report dtd Feb. 19, 2024 for Application No. 202180068865.X.

\* cited by examiner

POLYANILINE COMPOSITIONS, ARTICLES THEREOF, AND METHODS THEREOF

CROSS-REFERENCE TO RELATED APPLICATIONS

This application claims benefit of U.S. Provisional Patent Application No. 63/089,439 filed Oct. 8, 2020.

FIELD

The present disclosure provides compositions, articles thereof, and methods of forming compositions.

BACKGROUND

A surface of a vehicle, such as an aircraft, in motion builds static charge. The nose may build a form of static electricity known as precipitation static (P-static). For example, an aircraft can have one or more components located behind the nose of the aircraft, which may be sensitive to static charge.

Surface coatings may be applied to aircraft components to protect surfaces of the aircraft components. However, conventional surface coating(s) of vehicle components of an aircraft are typically not highly conductive, having resistivity of hundreds of kOhms to tens of MegaOhms. Accordingly, conventional surface coatings of an aircraft can allow charge buildup on surfaces (and other components) of the aircraft. In addition to an inability to dissipate charge buildup, conventional coatings might not have ideal properties. For example, performance as to durability parameters such as rain erosion, resistance to high temperature, resistance to low temperature, and resistance to sand and hail damage might not be ideal for conventional surface coatings on a surface of a vehicle exposed to extreme conditions.

In addition, cold weather conditions promote buildup of ice on vehicle surfaces. To remove ice, chemicals are often sprayed onto the ice to promote melting. The chemicals are a cost burden on a user of the vehicle.

There is a need for new and improved compositions, articles having compositions, and methods for forming compositions.

SUMMARY

The present disclosure provides compositions, articles thereof, and methods of forming compositions.

In at least one aspect, a composition includes (1) an epoxy, (2) an amino or amido hardener, (3) a polyaniline, (4) a dopant selected from a triazolyl, a thiazolyl, a quinolinyl, a salicylate, a benzoate, a glycolate, a phosphate, or combination(s) thereof; and (5) a pigment selected from titanium dioxide, silica, talc, mica, aluminium stearate, or combination(s) thereof, where the polyaniline+dopant comprises greater than 6 wt % of the composition, by weight of the composition.

In at least one aspect, a substrate has a composition disposed thereon.

BRIEF DESCRIPTION OF THE DRAWINGS

So that the manner in which the above recited features of the present disclosure can be understood in detail, a more particular description of the disclosure, briefly summarized above, may be had by reference to examples, some of which are illustrated in the appended drawings. It is to be noted, however, that the appended drawings illustrate only typical examples of this present disclosure and are therefore not to be considered limiting of its scope, for the present disclosure may admit to other equally effective examples.

To facilitate understanding, identical reference numerals have been used, where possible, to designate identical elements that are common to the figures. It is contemplated that elements and features of one example may be beneficially incorporated in other examples without further recitation.

DETAILED DESCRIPTION

Figure 1A:
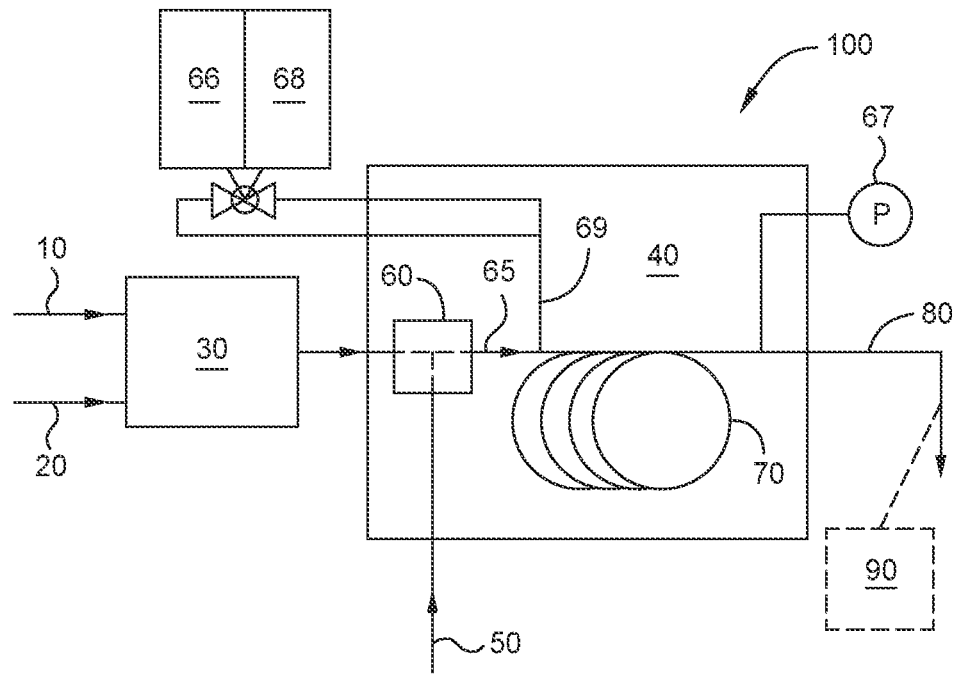
FIG. 1A is a diagram of an exemplary flow reactor system, according to one or more aspects.

The present disclosure provides compositions, articles thereof, and methods of forming compositions. The present disclosure relates to electrostatic dissipative compositions useful for components subjected to static buildup in use. The electrostatic dissipative compositions generally include high conductivity in addition to other ideal airworthiness properties.

Compositions of the present disclosure include (1) an epoxy, (2) amino or amido hardener, (3) a polyaniline, (4) a dopant selected from a triazolyl, a thiazolyl, a quinolinyl, a salicylate, a benzoate, a glycolate, a phosphate, an oxalate, a sulfonate, or combination(s) thereof, and (5) one or more pigments selected from titanium dioxide, silica, talc, mica, aluminium stearate, or combination(s) thereof, where the polyaniline+dopant comprises greater than 6 wt % of the composition, by weight of the composition. Articles of the present disclosure include a substrate and a composition disposed thereon. Methods for forming compositions of the present disclosure can include treating a polyaniline base with a dopant selected from a triazole, a thiazole, a quinoline, a salicylate, a benzoate, a glycolic acid, a phosphate, an oxalate, a sulfonate, combination(s) thereof.

Polyanilines are conjugated polymers having alternate single and double C—C bonds along the polymer chains. The conjugation of $\pi$ ("pi") electrons extends over the polymer backbone, and these polymers are electrically conductive and have switchable redox properties. In their oxidized form, the polymer backbone is positively charged and can bond with negatively charged ions (such as a negatively charged dopant). This phenomena is also referred to as doping.

Compositions

Compositions of the present disclosure include (1) an epoxy, (2) amino or amido hardener, (3) a polyaniline, (4) a dopant selected from a triazolyl, a thiazolyl, a quinolinyl, a salicylate, a benzoate, a glycolate, a phosphate, an oxalate, a sulfonate, or combination(s) thereof, and (5) one or more pigments selected from titanium dioxide, silica, talc, mica, aluminium stearate, or combination(s) thereof, where the polyaniline+dopant comprises greater than 6 wt % of the composition, by weight of the composition.

As used herein, a "composition" can include the components of the compositions and/or the reaction product(s) of two or more components of the composition.

Compositions of the present disclosure can have a volatile organic content of about 300 g/L or less, such as about 100 g/L to about 300 g/L, such as about 200 g/L to about 250 g/L, as determined by ASTM D3960-1. A composition having a volatile organic content of about 300 g/L or less can provide lowered volatile organic content which provides environmentally compatible (e.g., friendly) compositions.

Compositions of the present disclosure can have a volume solids of about 70% or greater, such as 80% or greater, such as about 90% or greater, based on the total volume of the composition. Volume solids is calculated for weighing out the ingredients and preparing the composition. The total solid content can be determined by evaporating off the solvents. A composition having a volume solids of about 70% or greater can provide lowered volatile organic content which provides environmentally compatible (e.g., friendly) compositions.

Compositions of the present disclosure can be disposed on one or more substrates. Compositions disposed on a substrate (e.g., as a layer) can be applied about 1 micrometer (μm) to about 100 μm in thickness, such as about 1 μm to about 10 μm in thickness, such as about 10 μm to about 80 μm, such as about 20 μm to about 60 μm, for example about 25 μm, about 35 μm, about 45 μm, about 50 μm. In at least one aspect, compositions have an electrochemical impedance of about $10^4 \Omega$ to about $10^9 \Omega$, such as about $10^6 \Omega$ when in contact with 3.5% NaCl solution. (This is the resistance of the coating to the ingress of NaCl. It is a measure of barrier protection. A higher value indicates better resistance.)

In at least one aspect, compositions have a resistance of about $10^4$ Ohms per square ($\Omega/\square$) to about $10^8 \Omega/\square$, such as about $10^5 \Omega/\square$ to about about $10^7 \Omega/\square$, such as about $10^6 \Omega/\square$. Conductivity provides electrostatic dissipation.

A substrate of the present disclosure can be a vehicle component or wind turbine component (such as turbine blade(s) or station(s)). A vehicle comprises any suitable transportation device. Vehicles include, but are not limited to, aircraft, automobiles, boats, motorcycles, satellites, rockets, missiles, etc., and therefore further include manned and unmanned aircraft, manned and unmanned spacecraft, manned and unmanned terrestrial vehicles, manned and unmanned non-terrestrial vehicles, and even manned and unmanned surface and sub-surface water-borne marine vehicles, objects, and structures.

A vehicle component may comprise one or more compositions of the present disclosure disposed on one or more surfaces of the vehicle component. A vehicle component includes, but is not limited to, any component of a vehicle, such as a structural component, such as a panel or joint of the vehicle. Examples of a vehicle component include an airfoil (such as a rotor blade), an auxiliary power unit, a nose of an aircraft, a fuel tank, a tail cone, a panel, a coated lap joint between two or more panels, a wing-to-fuselage assembly, a structural aircraft composite, a fuselage body-joint, a wing rib-to-skin joint, and/or other internal component.

Epoxies and Amino/Amido Hardeners

Compositions of the present disclosure can include one or more epoxies and one or more amino hardeners and/or one or more amido hardeners.

In at least one aspect, a composition includes ((epoxy+amino hardener) or (epoxy+amido hardener)) in an amount of about 40 wt % to about 75 wt %, such as about 45 wt % to about 65 wt %, alternatively about 55 wt % to about 75 wt %, based on the total weight of the composition.

In at least one aspect, a composition includes one or more epoxies in an amount of about 30 wt % to about 50 wt %, such as about 30 wt % to about 40 wt %, alternatively about 35 wt % to about 45 wt %, based on the total weight of the composition. In at least one aspect, a composition includes one or more amino hardeners in an amount of about 12 wt % to about 22 wt %, such as about 12 wt % to about 18 wt %, alternatively about 15 wt % to about 21 wt %, based on the total weight of the composition. In at least one aspect, a composition includes one or more amido hardeners in an amount of about 12 wt % to about 22 wt %, such as about 12 wt % to about 18 wt %, alternatively about 15 wt % to about 21 wt %, based on the total weight of the composition.

Epoxies can include partially cured epoxies, a particular addition of epoxies, two-component epoxy resin that includes a catalyst (such as HYSOL® EA 956 epoxy resin available from Henkel Corporation of Bay Point, California), a two liquid system that includes a resin and a hardener of the present disclosure (such as EPOFIX resin available from Struers A/S of Ballerup, Denmark), triglycidyl ethers of aminophenol (such as Araldite MY 0500 or MY 0510 from Huntsman Advanced Materials (Monthey, Switzerland)), tetrafunctional epoxies such as N,N,N',N'-tetraglycidyl-m-xylenediamines (such as Araldite MY0720 or MY0721 from Huntsman Advanced Materials (Monthey, Switzerland)), and mixtures thereof. Epoxies also comprise a difunctional epoxy, such as a Bisphenol-A (Bis-A) or Bisphenol-F (Bis-F)-based epoxies. Bis-A epoxy resins can be available commercially as Araldite GY6010 (Huntsman Advanced Materials) or DER 331, which is available from Dow Chemical Company (Midland, Mich.). A Bis-F epoxy resin is available commercially as Araldite GY281 and GY285 (Huntsman Advanced Materials). Epoxies, for example, are suitable for thermosets on the outside of aircraft because they are durable. In one or more aspects, an epoxy is a bisphenol-A epoxy that is Araldite GY 250 or GY 9090 available from Huntsman Advanced Materials).

Amino hardeners include polyaminoamine hardeners (such as Aradur 450 commercially available from Huntsman Advanced Materials (Monthey, Switzerland), Aradur 2973 (which is an aliphatic polyamine hardener commercially available from Huntsman Advanced Materials (Monthey, Switzerland)), a polyetheramine having a Tg of about 40° C. to about 100° C. (such as JEFFAMINE® T-403 amine or JEFFAMINE® D-230 amine), an ethyleneamine having a Tg of about 110° C. to about 125° C. (such as diethylenetriamine, triethylenetetramine, tetraethylenepentamine, or N-aminoethylpiperzine), a cycloaliphatic amine having a Tg of about 145° C. to about 175° C. (such as bis-(p-aminocyclohexyl)methane, diaminocyclohexane, or bis-(dimethyl-diaminocyclohexyl)methane), or an aromatic amine having a Tg of about 160° C. to about 220° C. (such as methylene dianiline, m-phenylene diamine, or diaminophenyl sulfone).

Amido hardeners include Aradur 360 (which is a polyamidoamine hardener commercially available from Huntsman Advanced Materials (Monthey, Switzerland)) or a polyamide or amidoamine having a Tg of about 40° C. to about 100° C. (such as VERSAMID® 125 polyamide or GENAMID® 490 amidoamine).

Polyanilines and Dopants

Compositions of the present disclosure can include one or more polyanilines and one or more dopants. In at least one aspect, a composition includes polyaniline+dopant in an amount of greater than 6 wt %, such as about 6.5 wt % to about 75 wt %, such as about 10 wt % to about 60 wt %, such as about 20 wt % to about 50 wt %, such as about 25 wt % to about 40 wt %, such as about 30 wt % to about 35 wt %, based on the total weight of the composition.

Inorganic pigments include $TiO_2$, Talc, Mica, Silica and Al-stearate.

In at least one aspect, a composition includes the polyaniline in an amount of about 3 wt % to about 75 wt %, such as about 10 wt % to about 60 wt %, such as about 20 wt % to about 50 wt %, such as about 30 wt % to about 40 wt %, based on the total weight of the composition.

In at least one aspect, a composition includes the dopant in an amount of about 3 wt % to about 60 wt %, such as about 10 wt % to about 40 wt %, such as about 10 wt % to about 30 wt %, such as about 15 wt % to about 20 wt %, based on the total weight of the composition.

A molar ratio of dopant to aniline units of a polyaniline can be about 0.1:1 to about 1:1, such as about 0.3:1 to about 1:1, such as about 0.5:1 to about 1:1, such as about 1:1.

A dopant can be selected from a triazolyl, a thiazolyl, a quinolinyl, a salicylate, a benzoate, a glycolate, a phosphate, or combination(s) thereof. For example, a dopant can be a phosphate which can provide temperature stability of the composition at elevated temperatures (e.g., high cure temperature(s)).

In at least one aspect, a sulfonate is selected from a dinonylnaphthylenesulfonate, a naphthalenesulfonate, a benzenesulfonate, a toluenesulfonate, or combination(s) thereof.

In at least one aspect, a triazolyl is selected from benzotriazole, triazole carboxylic acid, benzotriazole sulphonic acid, or combination(s) thereof.

In at least one aspect, a thiazolyl is selected from one or more of benzothiazole, thiazole carboxylic acid, mercaptobenzothiazole, or combination(s) thereof.

In at least one aspect, a quinolinyl is selected from 8-hydroxyquinoline, mercaptoquinoline, or combination(s) thereof.

In at least one aspect, a salicylate is selected from salicylic acid, hydroxybenzoic acids, salt(s) thereof, or combination(s) thereof.

In at least one aspect, a benzoate is selected from benzoate, benzoic acid, methylbenzoic acids, salt(s) thereof, or combination(s) thereof.

In at least one aspect, a glycolate is selected from glycolate or thioglycolate.

In at least one aspect, a phosphate is selected from phosphoric acid or salt(s) thereof.

Polyanilines of the present disclosure can be formed using an aniline and a phosphoric acid, an aryl sulfonic acid, such as an alkyl-substituted aryl sulfonic acid (such as dinonylnaphthylenesulfonic acid (DNNSA)). For example, an alkyl-substituted aryl sulfonic acid can have 1 wt % or less of un-sulfonated hydrocarbon content. Conventional alkyl-substituted aryl sulfonic acids (such as DNNSA) have greater than 1 wt % of un-sulfonated hydrocarbon content. Un-sulfonated hydrocarbons can include branched and linear paraffins and/or aromatics (such as benzene and naphthalene). Use of, for example, DNNSA having 1 wt % or less of unsulfonated hydrocarbon content can provide polyanilines having reduced outgassing and improved thermal stability. Polyanilines and articles thereof having reduced outgassing and improved thermal stability can provide compositions of the present disclosure that can be applied as coatings, layers, etc. for use in a wide range of articles, such as aircraft, landcraft, wind turbines, satellites, etc. Alkyl-substituted aryl sulfonic acids (such as DNNSA) can be obtained from commercial sources (such as King Industries).

Polyanilines of the present disclosure can have a thermal stability of about 100° C. or greater, a weight average molecular weight (Mw) of about 50,000 g/mol to about 150,000 g/mol, and/or a molecular weight distribution (MWD) of about 1 to about 5. Reduced outgassing and improved molecular weight properties of polyanilines of the present disclosure provide improved thermal stability, as compared to conventional polyanilines.

Molecular weight data herein (Mw, Mn, Mz, Mp, and Mw/Mn) refer to neutral polyaniline (e.g., un-charged; un-doped forms of the polyaniline). In other words, molecular weight of polyanilines herein do not include the molecular weight added by the presence of a dopant.

Polyanilines of the present disclosure can have a weight average molecular weight (Mw) of about 50,000 g/mol to about 150,000 g/mol, such as about 75,000 g/mol to about 100,000 g/mol, alternatively about 100,000 g/mol to about 130,000 g/mol. Polyanilines of the present disclosure can have a number average molecular weight (Mn) of about 50,000 g/mol to about 100,000 g/mol, such as about 60,000 g/mol to about 80,000 g/mol, alternatively about 80,000 g/mol to about 100,000 g/mol.

Polyanilines of the present disclosure can have a molecular weight distribution (MWD) of about 1 to about 5, such as about 1 to about 4, such as about 1.2 to about 2.5, such as about 1.3 to about 1.7, as determined by gel permeation chromatography. MWD is determined by dividing Mw by Mn and may be referred to herein as "Mw/Mn".

Polyanilines of the present disclosure can have a z-average molecular weight (Mz) of about 75,000 g/mol to about 250,000 g/mol, such as about 100,000 g/mol to about 250,000 g/mol, such as about 150,000 g/mol to about 250,000 g/mol. Mz is indicative of high molecular content of a polymer. For example, Mz values of polyanilines of the present disclosure can be higher than Mz values of conventional polyanilines, which can provide improved processability as compared to conventional polyanilines.

Polyanilines of the present disclosure can have a peak average molecular weight (Mp) of about 50,000 g/mol to about 150,000 g/mol, such as about 100,000 g/mol to about 150,000 g/mol, such as about 110,000 g/mol to about 140,000 g/mol. Peak average molecular weight is indicative of the mode of the molecular weight of polymer distribution.

Molecular weight properties (such as Mw, Mn, Mz, Mp) of polyanilines can be determined using Gel Permeation Chromatography. The mobile phase can be 0.02 M ammonium formate (AF) in N-methylpyrrolidone (NMP). Calibration can be used to measure molecular weight distributions utilizing viscometric and refractive index detectors. The solutions can be filtered through a 0.45 micron filter prior to use. The polyaniline samples can be precipitated in spectroquality methanol, washed four times with methanol and recovered using vacuum filtration. The samples can be air dried, dissolved in AF-NMP, and passed through a 0.2 micron filter directly into GPC vials for analysis.

An article, e.g. a film, of a composition of the present disclosure can have a hydrocarbon content of about 1 wt % or less, such as about 0.5 wt % or less, such as about 0.1 wt % or less, based on the total weight of the sample. Hydrocarbons include C1-C20 paraffins and aromatic hydrocarbons such as benzene and naphthalene. In at least one aspect, a hydrocarbon is naphthalene.

A polyaniline (and/or composition (e.g., a layer)) of the present disclosure can have an outgassing % of about 0.5% or less, such as about 0.3% or less, such as about 0.1% or less, such as about 0.05% or less, such as about 0.01% or less, according to ASTM E595-93.

Polyanilines (and/or composition (e.g., a layer)) of the present disclosure can have a thermal stability of about 100° C. or greater, such as about 110° C. or greater, such as about 120° C. or greater, such as about 120° C. to about 160° C., such as about 130° C. to about 160° C., such as about 140° C. to about 160° C., such as about 150° C. to about 160° C.

Thermal stability can be determined by spin coating a polyaniline (or composition) onto a microscope slide and drying the spin coated sample at 70° C. Silver bars can be painted on the edges of slide for electrical contacts. Samples can be exposed to a temperature (e.g., 150° C.) for 24 hours in a convection oven. Then, the resistance of the sample can be measured to determine thermal stability.

In at least one aspect, a polyaniline is a PAN I-Acid represented by Formula (I):

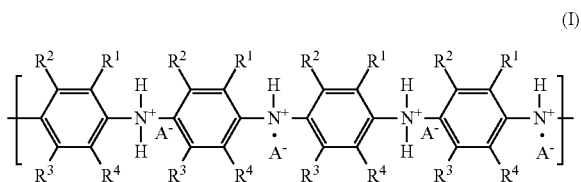

where each instance of $R^1$, $R^2$, $R^3$, and $R^4$ is independently selected from hydrogen, substituted or unsubstituted C1-C20 alkyl, substituted or unsubstituted C1-C20 aryl, substituted or unsubstituted C1-C20 alkaryl, substituted or unsubstituted C1-C20 arlyalkyl, substituted or unsubstituted C1-C20 alkoxyl, and halogen (such as fluoro, chloro, bromo, or iodo), wherein one or more instances of $R^1$, $R^2$, $R^3$, and $R^4$ are optionally substituted with a group independently selected from C1-C20 alkoxyl and halogen (such as fluoro, chloro, bromo, or iodo);
each instance of $A^-$ is a dopant;
n is an integer such that the weight average molecular weight (Mw) of the polyaniline is about 55,000 g/mol to about 80,000 g/mol, such as about 60,000 g/mol to about 75,000 g/mol, such as about 65,000 g/mol to about 70,000 g/mol.

In at least one aspect, each instance of $R^1$, $R^2$, $R^3$, and $R^4$ is independently selected from hydrogen and unsubstituted C1-C20 alkyl. In one or more aspects, C1-C20 alkyl is selected from methyl, ethyl, propyl, n-butyl, iso-butyl, sec-butyl, n-pentyl, iso-pentyl, sec-pentyl, n-hexyl, iso-hexyl, and sec-hexyl. In at least one aspect, each instance of $R^1$, $R^2$, $R^3$, and $R^4$ is hydrogen.

In at least one aspect, C1-C20 aryl is selected from phenyl and naphthyl. In at least one aspect, C1-C20 alkaryl is benzyl. In at least one aspect, C1-C20 arlyalkyl is toluyl, mesityl, or ethylbenzyl.

In at least one aspect, each instance of $A^-$ is a dopant independently selected from a triazolyl, a thiazolyl, a quinolinyl, a salicylate, a benzoate, a glycolate, a phosphate, or a sulfonate.

Alkyl-Substituted Aryl Sulfonic Acids, Anilines, and Methods for Preparing Polyanilines A representative non-limiting reaction scheme for forming polyanilines of the present disclosure is shown below in Scheme 1. As shown in Scheme 1, an aniline is treated with an alkyl-substituted aryl sulfonic acid and a catalyst to form a polyaniline represented by Formula (I).

Scheme 1

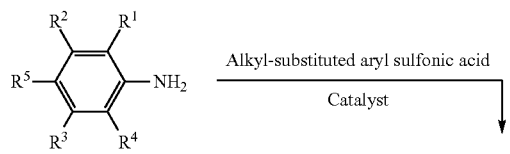

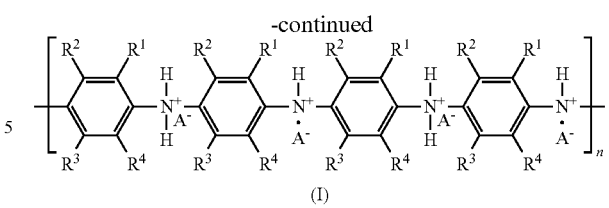

$R^1$, $R^2$, $R^3$, $R^4$ and $A^-$ of Formula (I) of Scheme 1 are as described for Formula (I) above.

For the aniline monomer of Scheme 1, each instance of $R^1$, $R^2$, $R^3$, and $R^4$ is independently selected from hydrogen, substituted or unsubstituted C1-C20 alkyl, substituted or unsubstituted C1-C20 aryl, substituted or unsubstituted C1-C20 alkaryl, substituted or unsubstituted C1-C20 arlyalkyl, substituted or unsubstituted C1-C20 alkoxyl, and halogen (such as fluoro, chloro, bromo, or iodo), wherein one or more instances of $R^1$, $R^2$, $R^3$, and $R^4$ are optionally substituted with a group independently selected from C1-C20 alkoxyl and halogen (such as fluoro, chloro, bromo, or iodo); and $R^5$ is hydrogen.

In at least one aspect, each instance of $R^1$, $R^2$, $R^3$, and $R^4$ of the aniline monomer of Scheme 1 is independently selected from hydrogen and unsubstituted C1-C20 alkyl. In one or more aspects, C1-C20 alkyl is selected from methyl, ethyl, propyl, n-butyl, iso-butyl, sec-butyl, n-pentyl, iso-pentyl, sec-pentyl, n-hexyl, iso-hexyl, and sec-hexyl. In at least one aspect, each instance of $R^1$, $R^2$, $R^3$, and $R^4$ is hydrogen.

Alkyl-substituted aryl sulfonic acids (or solutions thereof, e.g. organic solutions) of the present disclosure can have 1 wt % or less of unsulfonated hydrocarbon content and can be a dialkyl-substituted naphthyl sulfonic acid, such as DNNSA. Alkyl-substituted aryl sulfonic acids, such as DNNSA, having 1 wt % or less of unsulfonated hydrocarbon content can be obtained commercially from King Industries.

In at least one aspect, an alkyl-substituted aryl sulfonic acid (such as DNNSA) (or solution thereof) has a hydrocarbon content of about 1 wt % or less, such as about 0.5 wt % or less, such as about 0.1 wt % or less, based on the total weight of the DNNSA (the DNNSA absent additional solvent, e.g. isopropanol).

A molar ratio of dopant (e.g., alkyl-substituted aryl sulfonic acid):aniline in methods of forming polyanilines can be about 0.2:1 to about 2:1, such as about 0.3:1 to about 1:1, such as about 0.8:1 to about 1:0.8, such as about 1:1.

Catalysts for forming polyanilines can include any suitable ammonium or sulfate catalyst, such as ammonium persulfate.

Furthermore, addition of additional hydrocarbon solvent might not be preferred. Addition of high levels of, for example, heptane or hexane prevents an emulsion from forming. An emulsion promotes polyaniline formation. For example, if a method is performed with only DNNSA in heptane without 2-butoxyethanol, the reaction might not proceed to yield a soluble product.

Flow Reactor Processes for Forming Polyanilines

Processes using dopants (such as alkyl-substituted aryl sulfonic acid (such as DNNSA)) to form polyanlines (also referred to hereinafter as PANI-Acid) as a solvent-soluble polymer by flow reactor chemical processing are disclosed herein. The disclosed system and methods provide unique processing sequences for direct collection of the purified emeraldine salt without post reactor manipulation. The present systems and methods provide improvement over known methods of synthesizing conductive polymers, and in particular conductive polymer salts, for example, PANI-Acid using very short reaction times not otherwise obtainable using conventional methods, which require long reaction times.

By way of example, these systems and methods provide improvement in the efficient and controlled synthesis of polyaniline (PANI) salt as a soluble, intrinsically conductive polymer. A continuous flow synthesis of PAN I-Acid or an "emeraldine salt" is herein described using a flow reactor. In some examples the flow reactor comprises a microfluidic (1 to about 750 um I.D.) tube reactor. In some examples, the microfluidic tube comprises a fluoropolymer, e.g., TEFLON®. The tube reactor provides a suitable surface for deposition of the forming polymer and a straightforward purification of the conductive polymer salt.

As used herein, the phrase "flow reactor" is inclusive of a micro-flow reactor. A micro-flow reactor is used herein as a flow reactor having flow dimensions, e.g., tubing inner diameter (I. D.), less than 1 mm (1000 microns).

As further described below, in some examples as the polymerization reaction proceeds, the majority of the polymer product deposits on the walls of the tubing. The polymeric product can be purified by washing with water to remove aqueous soluble reactants, reagents, and side products.

The conductive polymer salts formed in the flow reactor and deposited on the walls of the tubing can be eluted with organic solvent to provide soluble conductive polymer salt. The apparatus is configurable for in-situ characterization e.g., by UV-Vis spectroscopy, infrared, and/or mass spectroscopy.

An apparatus and related methods for polymerizing at least one reactant are described. In certain examples, the apparatus is a microfluidic apparatus comprising a mixing chamber and microchannel. In addition, the reactor can further comprise an output chamber and a detection unit that is operatively connected to the microchannel.

Any suitable apparatus (e.g., flow reactor) can be used to form polyanilines of the present disclosure, such as those described in U.S. Pat. No. 10,118,992, which is incorporated by reference herein.

With reference to FIG. 1A, flow reactor system 100 shown. First reactant 10 (e.g., an aniline) and second reactant 20 (e.g., an alkyl-substituted aryl sulfonic acid) are introduced to first mixing unit 30. The reactor system 100 shown in FIG. 1A can produce conductive polymer salts (mass/per unit time) more efficiently than conventional macroscale devices or batch reactors. Flow reactor 100 is capable of operating at a range of processing temperatures from room temperature to about 250° C., such as at process temperatures less than 100° C. In some examples, ambient temperature is between about 50° F. (10° C.) to about 90° F. (32° C.). In some examples reactants 10, 20 are introduced, independently, to the first mixing unit 30 at a predetermined flow rate and/or predetermined concentration such that a desired molar ratio of reactants 10, 20 are mixed prior to being introduced to the flow reactor. In other examples, reactants 10, 20 are introduced together to the first mixing unit 30 such that a desired molar ratio of reactants 10, 20 are mixed prior to being introduced to the flow reactor. First mixing unit 30 can be any suitable mixing device. In some examples, the mixing device is a high-speed or ultrahigh speed mixing device capable of emulsifying one or more solutions, for example an aqueous solution and a non-aqueous solution. In some examples, first reactant 10 is contained in an aqueous solution and second reactant 20 is contained in a non-aqueous solution, whereas first mixing unit 30 is designed for emulsifying first reactant 10 and second reactant 20. Third reactant 50 joins first and second reactants in second mixing unit 60. In some examples, reactant 50 is a catalyst. After mixing in second mixing unit 60, reactants are introduced to tubing 70 via inlet port 65. Tubing 70 comprises discharge port 80, which can be monitored by analysis equipment 90. Analysis equipment 90 can include spectroscopic equipment to interrogate and analyze materials flowing from discharge port 80, such as unreacted materials and/or reaction products. Spectroscopic equipment includes UV-Vis, IR (near-, mid-, and far-IR), and mass spectroscopy. Other analytical and interrogating techniques can be used, such as capacitance, pH, etc. Pressure regulating unit 67 can be positioned at the outlet of flow reactor 70 for monitoring a change in pressure during polymerization or during the collection step of polymerized material and information from pressure regulating unit 67 can be used by a controller to cease introduction of the reactants (e.g., aniline) to the flow reactor. An additional pressure regulating unit 67 can also be positioned at the inlet of flow reactor 70 for example, for monitoring changes in pressure during the process. Fluid lines 69 can be independently fluidically coupled to flow reactor 70 so as to introduce purging media 66 (e.g., water) or collecting medium 68 (e.g., solvent) for collecting polymerization product from flow reactor units 70.

In some examples, flow reactor system 100 has a single inlet port to the tubing 70. In other examples, flow reactor system 100 has additional inlet ports positioned between inlet port 65 and discharge port 80. As shown in FIG. 1A, tubing 70 can be coiled around to provide an extended tubular flow reactor.

In some examples, tubing 70 is contained in housing 40 that provides temperature control and/or support and/or protection from damage of the tubing 70. In some examples, housing 70 has an inside surface surrounding at least a portion of the tubing 70 such that the coiled tubing 70 is at least partially contained within the housing 40. In some examples, housing 40 is configured to provide temperature control to the tubing 70, which includes heating and/or cooling.

Figure 1B:
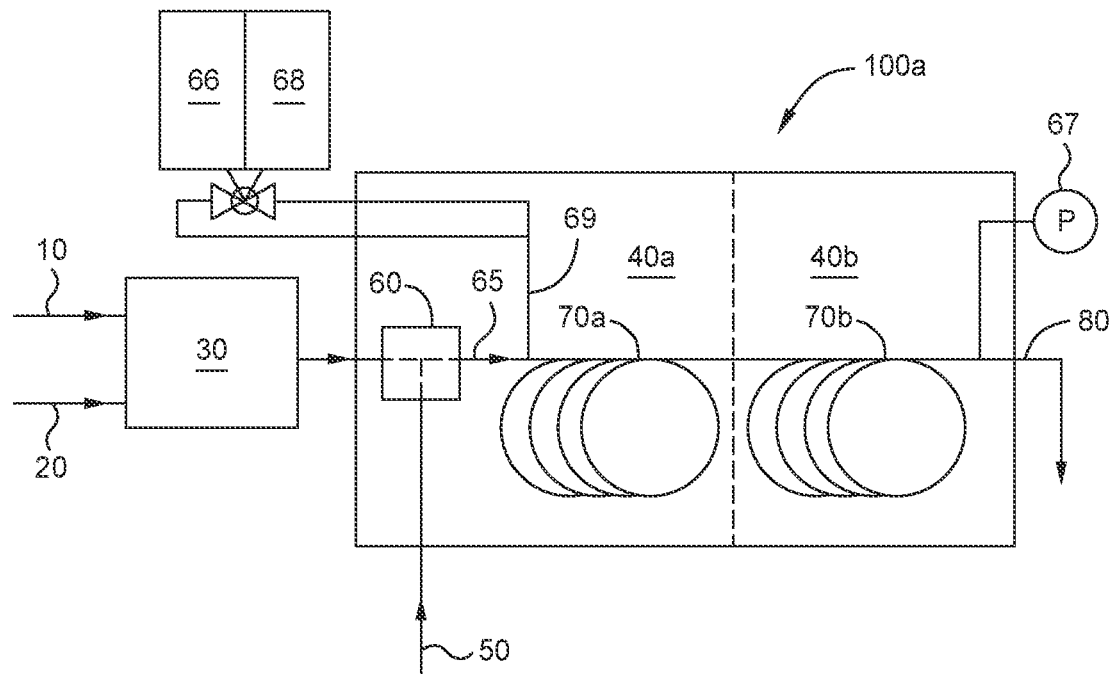
FIG. 1B is a diagram of an exemplary series flow reactor system, according to one or more aspects.

As shown in FIG. 1B, alternate flow reactor configuration 100 a is shown with plurality of tubing 70 a, 70 b arranged in a coil configuration coupled in series. Tubing 70a, 70b can be dimensionally the same or can have different lengths and/or different inner diameters. In this configuration, the housing can be bifurcated into separate, sections 40a, 40b receiving tubing 70a, and 70b that can be independently manipulated for heating and/or cooling the tubing. Alternatively, flow reactor configuration 100a can have a single housing receiving tubing 70a, 70b. In contrast to a parallel array configuration of the tubing, where the process stream is split prior to entering the flow reactor, the series array maximizes the amount of time that the reaction mixture is maintained in a diffusion-limiting condition. While not to be held by any particular theory, it is believed that maintaining the reaction mixture in a diffusion limiting condition provides improvement of the presently disclosed reactions for producing conductive polymer salts from reactants in emulsion compared to batch processing. The present methods and systems disclosed herein provide for such a diffusion limiting condition for the emulsion of reactants.

Figure 1C:
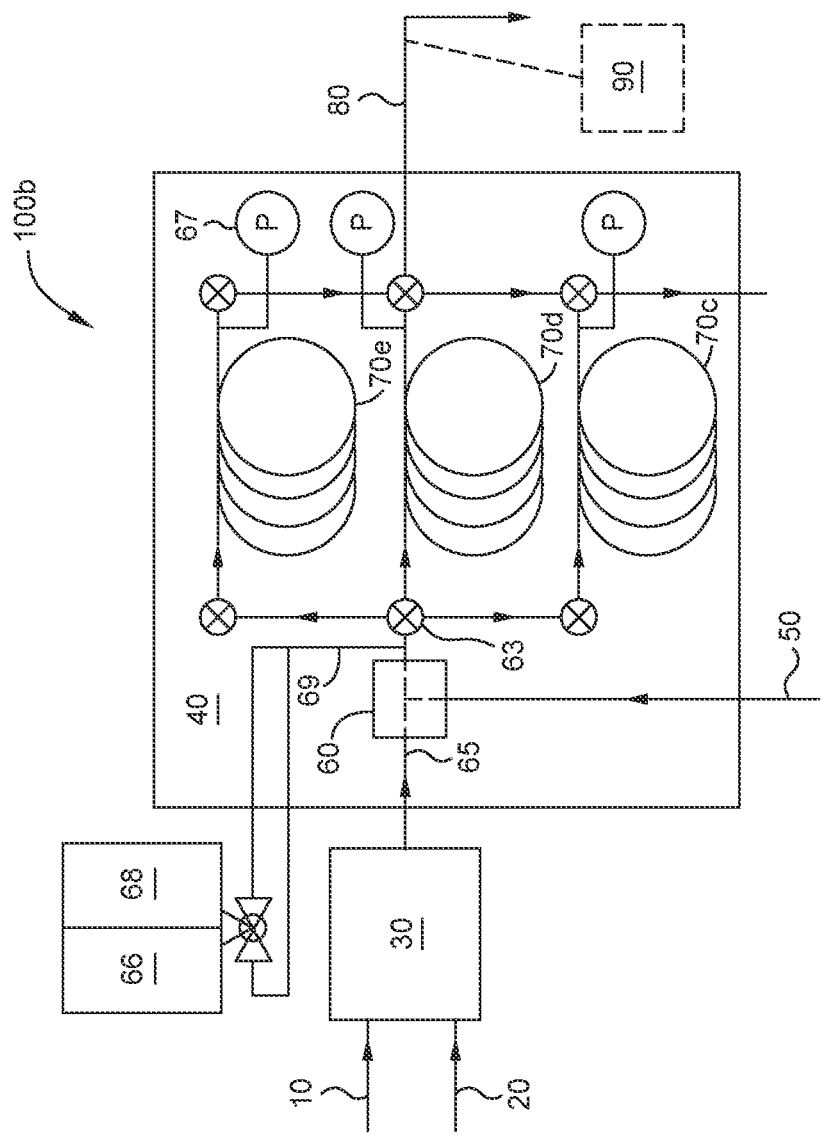
FIG. 1C is a diagram of an exemplary parallel flow reactor system, according to one or more aspects.

With reference to FIG. 1C, an exemplary flow reactor system 100b is shown. A plurality of flow reactor units 70c, 70d, and 70e, are shown in a parallel flow configuration. Each flow reactor 70c, 70d, and 70e, independently, can be isolated via flow control valves 63 situated at the inlet and outlet of each flow reactor introduction of monomer solution to the corresponding flow reactor. Flow control valves 63 can be manually operated and/or solenoid-based configured for computer-control using conventional controlling devices. Flow control valves 63 can contain one or more check valves for preventing backflow of dispersion solution. One or more pressure regulating units 67 can be positioned at the outlet of one or more of the flow reactors for monitoring a change in pressure during polymerization or during the collection step of polymerized material. Additional pressure regulating units 67 can also be positioned at the inlet of each flow reactor. Flow control valves 63 can be coupled to pressure data from the controller so as to isolate one or more of the flow reactors 70c, 70d, and 70e, for activating purge and/or polymer recovery. In this configuration, flow reactor system 100b can be continuously operated by selectively isolating one or more flow reactor units 70c, 70d, and 70e for collecting polymerization product and/or maintenance while maintaining monomer introduction to one or more of the remaining flow reactor units. Alternatively, flow reactor system 100b can be semi-continuously operated, for example by temporarily ceasing the introduction of monomer to one or more of the flow reactor units 70c, 70d, and 70e. Additional fluid lines 69 can be independently fluidically coupled to one or more of the flow control valves 63 so as to introduce purging media 66 (e.g., water) or collecting medium 68 (e.g., solvent) for collecting polymerization product selectively from one or more flow reactor units 70c, 70d, and 70e. One or more of flow reactor units 70c, 70d, and 70e can be physically removed from flow reactor system 100b for transport with or without polymerization product recovered from in the inner diameter of the tubing.

Tubing length can be chosen based on the ability of the selected components of the system (pump, tubing burst strength, fittings, etc.) to handle pressure. The maximum length of tubing suitable for use with the presently disclosed system is a function of back-pressure and the ability to transport product through the entire length of the tubing. In some examples, the system can be configured to operate at a tubing length coupled with a tubing inner diameter such that the system operates at or below about 20 bar (280 psi). In some examples, the length of tubing does not exceed 500 meters with tubing having an inner diameter of less than 4000 microns. In other examples, the tubing is tubing of diameter less than 1000 microns (microfluidic tubing) with a length of about 100 meters or less. Other combinations of tubing diameter and length can be used commensurate with the operating parameters of the system and the desired reaction volume per unit time.

Molecular weight properties (such as Mw, Mn, Mz, Mp) of polyanilines can be determined using Gel Permeation Chromatography. The mobile phase can be 0.02 M ammonium formate (AF) in N-methylpyrrolidone (NMP). Calibration can be used to measure molecular weight distributions utilizing viscometric and refractive index detectors. The solutions can be filtered through a 0.45 micron filter prior to use. The polyaniline samples can be precipitated in spectroquality methanol, washed four times with methanol and recovered using vacuum filtration. The samples can be air dried, dissolved in AF-NMP, and passed through a 0.2 micron filter directly into GPC vials for analysis.

The PANI-Acid can then be converted into a polyaniline hydroxide (referred to as a "de-doped" polyaniline). For example, a PANI-Acid can be treated using a hydroxide to form the polyaniline hydroxide. For example, a PANI-Acid can be treated with 1 M ammonium hydroxide for a time of about 30 minutes to about 6 hours, such as about 2 hours. The polyaniline hydroxide product can then be filtered and washed with, for example, water and dried. The polyaniline hydroxide can then be treated with a dopant by introducing the polyaniline hydroxide to a triazole, a thiazole, a quinoline, a salicylic acid, a benzoic acid, a glycolic acid, a phosphoric acid, or combination(s) thereof. Without being bound by theory, it is believed that an anionic form of the dopant(s) exchange with hydroxides coupled the polyaniline (of the polyaniline hydroxide) to form a polyaniline+dopant of the present disclosure (which may be referred to as a "re-doped" polyaniline). The re-doped polyaniline can be filtered and washed with, for example, water (e.g., deionized water) and dried (e.g., at elevated temperature such as about 60° C.).

Pigments

In at least one aspect, a composition of the present disclosure includes a pigment selected from titanium dioxide, silica, talc, mica, an aluminium stearate, or combination(s) thereof.

Pigments of the present disclosure can provide opacity to a composition. For example, the composition containing pigment(s) covers the substrate to make the covered substrate opaque.

In at least one aspect, a composition includes each of titanium dioxide, talc, mica, silica, and an aluminium stearate. For example, a composition can include titanium dioxide in an amount of about 0.01 wt % to about 10 wt %, such as about 6 wt % to about 10 wt %, such as about 7 wt % to about 9 wt %, based on the total weight of the composition. A composition can include talc in an amount of about 0.01 wt % to about 10 wt %, such as about 2 wt % to about 8 wt %, such as about 3 wt % to about 6 wt %, based on the total weight of the composition. A composition can include mica in an amount of about 0.01 wt % to about 10 wt %, such as about 2 wt % to about 8 wt %, such as about 3 wt % to about 6 wt %, based on the total weight of the composition. A composition can include silica in an amount of about 0.01 wt % to about 10 wt %, such as about 2 wt % to about 8 wt %, such as about 3 wt % to about 6 wt %, based on the total weight of the composition.

A composition can include aluminium stearate in an amount of about 0.01 wt % to about 0.5 wt %, such as about 0.1 wt % to about 0.4 wt %, based on the total weight of the composition.

Compositions and Layers of Compositions

In at least one aspect, a method for forming a composition comprises mixing (1) an epoxy, (2) amino or amido hardener, (3) a polyaniline, (4) a dopant selected from a triazolyl, a thiazolyl, a quinolinyl, a salicylate, a benzoate, a glycolate, a phosphate, an oxalate, a sulfonate, or combination(s) thereof, and (5) one or more pigments selected from titanium dioxide, silica, talc, mica, aluminium stearate, or combination(s) thereof to form a composition. Mixing can include diffusion and/or active mixing (e.g., with a stirrer). The method may include disposing (e.g., depositing) the composition onto a substrate to form a layer comprising the composition. A method can include curing the composition. The method may include dissolving one or more components of the composition in a solvent before mixing. A solvent can be a xylene, a toluene, dimethyl sulfoxide, water, or mixture(s) thereof.

In at least one aspect, a substrate is a metal substrate made of aluminum, aluminum alloy, nickel, iron, iron alloy, steel, titanium, titanium alloy, copper, copper alloy, or mixture(s) thereof. In some aspects, a substrate is aluminum, carbon fiber epoxy, fiberglass reinforced polymer, cellulose reinforced phenolic resin, polyimide, glass, poly ether ether ketone, poly ether ketone, polystyrene, polypropylene, polytetrafluoroethylene, or combination(s) thereof. A substrate can be a 'bare' substrate, having no plating (e.g., unplated metal), conversion coating, and/or corrosion protection between the substrate and the composition. Additionally or alternatively, a substrate can include surface oxidization. Hence, a composition can be directly disposed on the substrate and/or to a surface oxide layer on a surface of the substrate or a surface pre-treated with a conversion coating or adhesion promoter.

In at least one aspect, a secondary layer is disposed on (e.g., deposited onto) the composition (disposed on the substrate). A secondary layer can be an organic material (e.g., organic chemical compositions) configured to dispose on (e.g., adhere to) a composition. A secondary layer can include a paint, a topcoat, a polymeric coating (e.g., an epoxy coating, and/or a urethane coating), a polymeric material, a composite material (e.g., a filled composite and/or a fiber-reinforced composite), a laminated material, or mixture(s) thereof. In at least one aspect, a secondary layer includes a polymer, a resin, a thermoset polymer, a thermoplastic polymer, an epoxy, a lacquer, a polyurethane, a polyester, or combination(s) thereof. A secondary layer can additionally include a pigment, a binder, a surfactant, a diluent, a solvent, a particulate (e.g., mineral fillers), fibers (e.g., carbon, aramid, and/or glass fibers), or combination(s) thereof.

Composition thickness (e.g., a layer including a composition) can be utilized to tune one or more of (1) conductivity and (2) resistance of a composition disposed on a substrate. Composition thickness may also be utilized to further tune "airworthiness" properties (such as rain erosion and resistance to sand and hail damage) of the composition and resulting coated substrate.

Compositions of the present disclosure may be disposed on (e.g., deposited onto) a surface, such as a surface of a vehicle component, by any suitable method, such as dipping, spraying, brush coating, spin coating, roll coating, doctor-blade coating, or combination(s) thereof. The composition may be cured before or after application to a vehicle component surface. For example, a composition may be deposited onto a vehicle component. Once deposited, the composition may be heated to cure the composition. An elevated temperature may be used to accelerate the curing process. Curing promotes evaporation of one or more solvents (if present) in the composition, such as xylenes, toluene, and/or water.

A method may include rinsing the composition with a rinsing agent (for example, in aspects where the composition is disposed on a substrate as a layer). The rinsing agent can include isopropyl alcohol, p-Toluenesulfonic acid, acetone, methanol, hydrates thereof, solvates thereof, or mixtures thereof. Rinsing may include spraying the rinsing agent onto a surface of the composition for about 1 second to about 10 minutes, such as about 1 minute to about 5 minutes. Rinsing may include spraying the rinsing agent onto a surface of a composition of an amount of about 1 mL to about 25 kL, such as about 1 L to about 100 L, such as about 1 L to about 5 L, for example 1 L, 2 L, 3 L, 4 L, 5 L. Rinsing may include rinsing the first composition with a second rinsing agent, different than the first rinsing agent, and that is isopropyl alcohol, p-Toluenesulfonic acid, acetone, methanol, hydrates thereof, solvates thereof, or mixtures thereof. In at least one aspect, rinsing comprises dipping the composition into the rinsing agent for about 1 second to about 1 minute.

Curing the composition may include raising the temperature of the composition to a peak curing temperature and maintaining the peak curing temperature for about 1 second to about 48 hours, such as about 1 hour to about 10 hours. The peak curing temperature can be about room temperature to about 200° C., such as between about 50° C. and about 90° C., for example 50° C., 60° C., 70° C., 80° C., 90° C.

Disposing (e.g., depositing) the composition onto the substrate may be achieved by spin-coating the composition onto a surface of a substrate, such as a vehicle component, at a rate of about 100 rpm to about 4,000 rpm, such as about 500 rpm to about 2,000 rpm, for example about 500 rpm, about 1,000 rpm, about 1,500 rpm, about 2,000 rpm.

Alternatively, disposing the composition onto the substrate is achieved by spraying the composition onto a surface of a substrate, such as a vehicle component using any suitable composition spray apparatus.

In at least one aspect, a method of heating a vehicle component comprises applying a voltage to a surface of a composition disposed on a vehicle component. Applying the voltage to the surface of the composition at least partially melts solid water (ice) disposed on a surface of the vehicle component. The voltage can be an alternating current (AC) voltage of about 10 Hertz to about 2000 Hertz, such as about 500 Hertz to about 1,000 Hertz, for example about 500 Hertz, about 600 Hertz, about 700 Hertz, about 800 Hertz, about 900 Hertz. The voltage can be an alternating current (AC) voltage of about 10 volts to about 2000 volts, such as about 100 volts to about 500 volts, for example about 100 volts, about 200 volts, about 300 volts, about 400 volts, about 500 volts.

Composition Thickness. Coating thickness may be measured by Eddy current based probes from ELCOMETER or from DEFELSKO.

Resistance. Resistance measurements may be made using any suitable set of electrodes and measurement apparatus, such as a Keithley 4200 SCS. Preferably, resistance measurements are made using the van der Pauw method. The four-point method uses parallel source and sense measurements of current and voltage, respectively, across a sample surface. Current and voltage polarities are switched across each junction to test for ambipolarity. Sample geometry should be held constant and allows for the direct comparison of samples. In order to account for differences in the charge directionality, the current and voltage measurements are rotated across each possible arrangement, as shown in Table 1.

TABLE 1

Possible electrode arrangements for resistance measurements

| R | Source I | Sense V |
|---|---|---|
| $R_A$ | 1-2 | 3-4 |
| $R_B$ | 2-3 | 4-1 |
| $R_C$ | 3-4 | 1-2 |
| $R_D$ | 4-1 | 3-2 |

Van der Pauw resistance measurements are performed by forcing a current across two adjacent electrodes and sensing the voltage drop across the sample in a parallel arrangement of electrodes.

The sheet resistance may be calculated from the ratio of V to I from the measured composition. In the case of a sample showing truly isotropic resistance, $R_A=R_B=R_C=R_D$. In the case of isotropic resistances, e.g., where $R_A=R_B$, the sheet resistance is determined by the average of the two measured resistances, as shown in Equation 1 below. For samples with anisotropic resistances (the x-direction and y-direction demonstrate different resistances), calculating the sheet resistance becomes more complicated, which will be addressed in the following paragraph. For all samples where $R_A \neq R_C$ and $R_B \neq R_D$, the measurement is void. Equation 2 shows how the bulk resistivity, p, is determined if the composition thickness, d, is known (typically resistivity is reported in a cm, thus comprises the use of d in cm), which is derived from the original Van der Pauw theorem. Bulk resistivity, ρ, can then be used to calculate conductivity, σ (S·cm-1), which is inversely proportional (Equation 2).

$$R_S = \frac{R_A + R_B}{2} \qquad \text{Eqn. 1}$$

$$\rho = \frac{\ln(2)d}{\pi R_S} = \frac{1}{\sigma} \qquad \text{Eqn. 2}$$

For cases where $R_A \neq R_B$, extracting conductivity values from the Van der Pauw equation becomes more difficult. In the case where the conductivity is not isotropic, the conductivity becomes a tensor value with x, y, and z dimensions. In the case of very thin compositions, an accurate conductivity value may be obtained by taking the square of the product of the perpendicular conductivity measurement values, as shown in Equation 3 below. This calculation is only true if the directions being measured align with the tensor axes of the conductivity. It is assumed that the larger of the two resistances measured by the technique is exactly along the lowest conductivity tensor, and the lower of the resistance measurements is exactly along the highest conductivity tensor. If there were a misalignment of the conductivity tensor with the electrode/sample orientation an inaccurate conductivity value would be measured.

$$\sigma = \sqrt{\sigma_A \cdot \sigma_B} \qquad \text{Eqn. 3}$$

For the van der Pauw measurement chip, the numbers correspond to axis of the measurement while the sigmaX notations ($\sigma_A$, $\sigma_B$, and $\sigma_C$) represent the conductivity tensor directions. A mismatch of sample axis and tensor axis leads to inaccurately measured conductivities. The van der Pauw printed electrodes with the Keithley 4200 SCS provide a suitable device test bed for the measurement of samples.

In an effort to control the measurement humidity effects, a small sample probe station may be used to exclusively connect to the Keithley 4200 SCS for accurate van der Pauw measurements on the Dropsens prefabricated electrodes.

Electrochemical Impedance Spectroscopy (EIS). EIS uses a variable frequency alternating current source to probe the changes to a sample's impedance at different frequencies. Impedance, similar to a resistor, is the lag between an applied alternating current and the measured voltage change. Electrical circuit components respond in frequency dependent ways, which can be used to identify specific properties of a coating being measured. True ohmic resistors respond identically to direct current (DC) and alternating current (AC) sources, and thus show no frequency-dependent resistive response. Capacitors (as well as more complex electrical components) have a frequency-dependent response; at low frequencies the impedance is very high but at high frequencies the electrical impedance is lower. In the analysis of EIS data, a predicted model, known as the equivalence circuit model, is made composed of real and approximated electrical components to closely approximate the sample system. The model's calculated impedance spectra are then compared to the measured spectra.

Composition Applications

Non-limiting examples for uses of compositions of the present disclosure comprise uses as a thermoplastic and/or as a component of prepreg material. For prepreg material, compositions of the present disclosure may be applied onto and/or impregnated into fiber materials composed of graphite, fiberglass, nylon, Kevlar® and related materials (for example, other aramid polymers), polyethylenes, among others.

Compositions of the present disclosure may be deposited onto a surface of a substrate, such as a vehicle component. Vehicle components include a structural component such as a panel or joint of an aircraft, automobile, ship, etc. Examples of a vehicle component include an airfoil (such as a rotor blade), an auxiliary power unit, a nose of an aircraft, a fuel tank, a tail cone, a panel, a coated lap joint between two or more panels, a wing-to-fuselage assembly, a structural aircraft composite, a fuselage body-joint, a wing rib-to-skin joint, and/or other internal component.

As compared to conventional coatings, compositions and methods of the present disclosure provide reduced dopant leach out over time in part because dopant can be coupled with polyaniline (e.g., emaraldine form of polyaniline).

Deicing: After depositing one or more compositions of the present disclosure onto a substrate, such as a vehicle component, (and optional curing), the component may be "deiced" if, for example, harsh weather conditions have resulted in accumulation of ice on one or more components. Because compositions of the present disclosure may be conductive, application of a voltage to a surface containing the composition will result in increased temperature of the surface and melt a portion of the ice accumulated on the surface. In at least one aspect, a voltage is applied to a surface containing one or more compositions of the present disclosure that provides complete melting of ice accumulation on the surface. In at least one aspect, a voltage is applied to a surface containing one or more compositions of the present disclosure that provides partial melting of ice accumulation on the surface such that the partially melted ice accumulation slides off of the vehicle component.

In at least one aspect, deicing comprises contacting any suitable AC/DC voltage generator with a surface containing one or more compositions of the present disclosure, and providing an AC voltage to the one or more compositions. Contacting an AC voltage generator with a surface containing one or more compositions (as a resistor) of the present disclosure provides resistive heating of at least the surface and may provide resistive heating of one or more layers of a vehicle component. In at least one aspect, deicing comprises providing voltage to a surface containing one or more compositions of the present disclosure by electrically generating components of an aircraft. For example, an aircraft engine is switched to the active mode and the AC power provided by an aircraft engine transmits to a surface of the aircraft which deices one or more surfaces of components of the aircraft. These aspects provide intrinsic deicing of an aircraft without a need to apply an external voltage generator to an aircraft component surface.

In at least one aspect, methods comprise providing an AC voltage to a composit at between about 10 Hertz and about 2000 Hertz, such as between about 200 Hertz and about 600 Hertz, for example about 400 Hertz. In at least one aspect, methods comprise providing an AC voltage to a composition at between 10 volts and about 2000 volts, such as between about 100 volts and about 400 volts, for example about 200 volts. Methods comprise adjusting the AC voltage with one or more transformers. Methods comprise adjusting the AC voltage into DC voltage with one or more rectifiers. Methods comprise adjusting the DC voltage into AC voltage with one or more oscillators.

Radome and other electrostatic dissipation: In an aircraft, a radar is present behind the nose of the aircraft. The nose often times builds up a form of static electricity known as precipitation static (P-static), which causes electrostatic interference with the radar in addition to brush discharge events causing damage to a coating on the outer surface of the aircraft. Electrostatic interference with the radar results in communication interference between the aircraft and the control tower on the ground as well as interference with detection of other aircraft in the sky. P-static further causes electrostatic interference with other components of an aircraft, for example, components that contain antenna(s). Furthermore, static charge often builds inside of a fuel tank of an aircraft which may affect fuel tank function.

If the aircraft is a fighter jet, for example, the canopy of the fighter jet often builds static charge, which causes static interference of radar(s) and antenna(s).

After disposing one or more compositions of the present disclosure onto a vehicle component (and optional curing), the one or more compositions can electrostatically dissipate static electricity such as P-static accumulated at a location on the aircraft, such as a nose of the aircraft. The electrostatic dissipation of static electricity provides reduced or eliminated electrostatic interference with a radar of the aircraft and reduced or eliminated brush discharge events resulting in reduced or eliminated damage to a coating on an outer surface of an aircraft. Compositions of the present disclosure further provide reduced or eliminated electrostatic interference with other components of an aircraft, such as components that contain antenna(s). If compositions of the present disclosure are coated inside of a fuel tank, the one or more compositions provide reduced or eliminated static charge buildup inside the fuel tank.

Airworthiness: In addition to an inability to dissipate charge buildup, coatings of the present disclosure have further improved "airworthiness". For example, performance as to durability parameters such as rain erosion, resistance to high temperature, resistance to low temperature, and resistance to sand and hail damage can be further improved when disposed on a surface of a vehicle, as compared to a conventional coating disposed on a surface of a vehicle. Compositions of the present disclosure can be "airworthy" and improve upon one or more parameters of airworthiness (as compared to conventional coatings) such as rain erosion, resistance to high temperature, resistance to low temperature, resistance to sand and hail damage, and visibility.

Compositions and methods of the present disclosure provide low resistance compositions (rinsed in a variety of rinsing agents), due at least in part to the removal of excess acid and a densification of the composition increasing the electrical percolation.

Aspects

The present disclosure provides, among others, the following aspects, each of which may be considered as optionally including any alternate aspects.

Clause 1. A composition comprising (or consisting of, or consisting essentially of):
an epoxy,
an amino or amido hardener,
a polyaniline,
a dopant selected from a triazolyl, a thiazolyl, a quinolinyl, a salicylate, a benzoate, a glycolate, a phosphate, an oxalate, a sulfonate, or combination(s) thereof; and
a pigment selected from titanium dioxide, silica, talc, mica, aluminium stearate, or combination(s) thereof, where the polyaniline+dopant comprises greater than 6 wt % of the composition, by weight of the composition.

Clause 2. The composition of Clause 1, wherein the polyaniline is an emeraldine form of the polyaniline.

Clause 3. The composition of Clauses 1 or 2, wherein the composition has a volatile organic content 300 g/L or less.

Clause 4. The composition of any of Clauses 1 to 3, wherein the composition has a volume solids of about 70% or greater, based on the total volume of the composition, as determined by weighing out the ingredients and preparing the composition. The total solid content can be determined by evaporating off the solvents.

Clause 5. The composition of any of Clauses 1 to 4, wherein the composition comprises (epoxy+amino hardener and/or amido hardener) in an amount of about 40 wt % to about 75 wt %, based on the total weight of the composition.

Clause 6. The composition of any of Clauses 1 to 5, wherein the composition comprises one or more epoxies in an amount of about 30 wt % to about 50 wt %, based on the total weight of the composition.

Clause 7. The composition of any of Clauses 1 to 6, wherein the composition comprises amino hardener in an amount of about 12 wt % to about 22 wt %, based on the total weight of the composition.

Clause 8. The composition of any of Clauses 1 to 7, wherein the composition comprises amido hardener in an amount of about 12 wt % to about 22 wt %, based on the total weight of the composition.

Clause 9. The composition of any of Clauses 1 to 8, wherein the epoxy is a bisphenol-A epoxy or bisphenol-F epoxy.

Clause 10. The composition of any of Clauses 1 to 9, wherein the composition comprises polyaniline+dopant in an amount of about 10 wt % to about 60 wt %, based on the total weight of the composition.

Clause 11. The composition of any of Clauses 1 to 10, wherein the composition comprises polyaniline+dopant in an amount of about 30 wt % to about 50 wt %, based on the total weight of the composition.

Clause 12. The composition of any of Clauses 1 to 11, wherein a molar ratio of dopant to aniline units of a polyaniline is about 0.3:1 to about 1:1.

Clause 13. The composition of any of Clauses 1 to 12, wherein the dopant is a triazolyl selected from benzotriazole, triazole carboxylic acid, benzotriazole sulphonic acid, salt(s) thereof, or combination(s) thereof.

Clause 14. The composition of any of Clauses 1 to 13, wherein the dopant is a thiazolyl selected from one or more of benzothiazole, thiazole carboxylic acid, mercaptobenzothiazole, salt(s) thereof, or combination(s) thereof.

Clause 15. The composition of any of Clauses 1 to 14, wherein the dopant is a quinolinyl selected from 8-hydroxyquinoline, mercaptoquinoline, salt(s) thereof, or combination(s) thereof.

Clause 16. The composition of any of Clauses 1 to 15, wherein the dopant is a salicylate selected from salicylic acid, hydroxybenzoic acids, salt(s) thereof, or combination(s) thereof.

Clause 17. The composition of any of Clauses 1 to 16, wherein the dopant is a benzoate selected from benzoic acid, methylbenzoic acids, salt(s) thereof, or combination(s) thereof.

Clause 18. The composition of any of Clauses 1 to 17, wherein the dopant is a glycolate selected from glycolate, thioglycolate, salt(s) thereof, or combination(s) thereof.

Clause 19. The composition of any of Clauses 1 to 18, wherein the dopant is a phosphate selected from phosphoric acid, salt(s) thereof, or combination(s) thereof.

Clause 20. The composition of any of Clauses 1 to 18, wherein the dopant is a sulfonate selected from dinonylnaphthylenesulfonic acid, naphthalenesulfonic acid, benzenesulfonic acid, toluenesulfonic acid, salt(s) thereof, or combination(s) thereof.

Clause 21. The composition of any of Clauses 1 to 19, wherein the composition comprises the pigment in an amount of about 0.01 wt % to about 40 wt %, based on the total weight of the composition.

Clause 22. The composition of any of Clauses 1 to 21, wherein the composition comprises the titanium dioxide, the silica, the talc, the mica, and the aluminium stearate.

Clause 23. The composition of any of Clauses 1 to 22, wherein the composition comprises titanium dioxide in an amount of about 0.01 wt % to about 10 wt %, based on the total weight of the composition.

Clause 24. The composition of any of Clauses 1 to 23, wherein the composition comprises talc in an amount of about 0.01 wt % to about 10 wt %, based on the total weight of the composition.

Clause 25. The composition of any of Clauses 1 to 24, wherein the composition comprises mica in an amount of about 0.01 wt % to about 10 wt %, based on the total weight of the composition.

Clause 26. The composition of any of Clauses 1 to 25, wherein the composition comprises silica in an amount of about 0.01 wt % to about 10 wt %, based on the total weight of the composition.

Clause 27. The composition of any of Clauses 1 to 26, wherein the composition comprises aluminium stearate in an amount of about 0.01 wt % to about 0.5 wt %, based on the total weight of the composition.

Clause 28. A substrate comprising the composition of any of Clauses 1 to 27 disposed thereon.

Clause 29. The substrate of Clause 28, wherein the cured composition thereon has a thickness of about 5 μm and about 100 μm.

Clause 30. The substrate of Clauses 28 or 29, wherein the cured composition has a resistance of about $10^4 \Omega/\square$ to about $10^8 \Omega/\square$.

Clause 31. The substrate of any of Clauses 28 to 30, wherein the substrate is a vehicle component selected from an airfoil, an auxiliary power unit, a nose of an aircraft, a fuel tank, a tail cone, a panel, a coated lap joint between two or more panels, a wing-to-fuselage assembly, a structural aircraft composite, a fuselage body-joint, or a wing rib-to-skin joint.

Clause 32. The substrate of any of Clauses 28 to 31, wherein the substrate comprises a metal substrate made of aluminum, aluminum alloy, nickel, iron, iron alloy, steel, titanium, titanium alloy, copper, copper alloy, or mixture(s) thereof.

Clause 33. The substrate of any of Clauses 28 to 32, wherein the substrate comprises aluminum, carbon fiber epoxy, fiberglass reinforced polymer, cellulose reinforced phenolic resins, polyimide, or combination(s) thereof.

Those familiar with the art of formulating paints and primers will appreciate that various modifications of the ingredients will yield coatings of different compositions and varying properties. Though the examples refer to specific resin systems from well known manufacturers, use of similar resins from others is possible within the scope of the present disclosure.

Overall, the present disclosure provides compositions, articles thereof, and methods for providing electrostatic dissipation and other "airworthiness" to substrates.

As used herein, a "vehicle component" comprises any component of a vehicle, such as a structural component, such as a panel or joint, of an aircraft, automobile, etc. The vehicle component comprises a nose, a fuel tank, a tail cone, a panel, a coated lap joint between two or more panels, a wing-to-fuselage assembly, structural aircraft composite, fuselage body-joint, wing rib-to-skin joint, and/or other internal component. Vehicle components also comprise any suitable component of an automobile, marine vehicle, wind turbine, housing/ground structure, drilling apparatus, and the like.

Compounds of the present disclosure include tautomeric, geometric or stereoisomeric forms of the compounds. Compounds of the present disclosure also include cationic and anionic forms of the compounds. Ester, oxime, onium, hydrate, solvate and N-oxide forms of a compound are also embraced by the present disclosure. The present disclosure considers all such compounds, including cis- and trans-geometric isomers (Z- and E-geometric isomers), R- and S-enantiomers, diastereomers, d-isomers, l-isomers, atropisomers, epimers, conformers, rotamers, mixtures of isomers and racemates thereof are embraced by the present disclosure.

While the foregoing is directed to examples of the present disclosure, other and further examples of the present disclosure may be devised without departing from the basic scope thereof. Furthermore, while the foregoing is directed to methods as applied to vehicle components, e.g. of the aerospace industry, examples of the present disclosure may be directed to other applications not associated with an aircraft, such as applications in the automotive industry, marine industry, energy industry, wind turbines, satellites, and the like.

The descriptions of the various examples of the present disclosure have been presented for purposes of illustration, but are not intended to be exhaustive or limited to the examples disclosed. Many modifications and variations will be apparent to those of ordinary skill in the art without departing from the scope and spirit of the described examples. The terminology used herein was chosen to best explain the principles of the examples, the practical application or technical improvement over technologies found in the marketplace, or to enable others of ordinary skill in the art to understand the examples disclosed herein. While the foregoing is directed to examples of the present disclosure, other and further examples of the present disclosure may be devised without departing from the basic scope thereof. Accordingly, it is not intended that this disclosure be limited thereby. Likewise whenever a composition, an element or a group of elements is preceded with the transitional phrase "including," it is understood that we also contemplate the same composition or group of elements with transitional phrases "consisting essentially of," "consisting of," "selected from the group consisting of," or "is" preceding the recitation of the composition, element, or elements and vice versa.

What is claimed is:

1. A composition comprising:
   an epoxy,
   an amino or amido hardener,
   a doped polyaniline,
   wherein a dopant of the doped polyaniline is selected from a benzoate, a glycolate, or combination(s) thereof; and
   a pigment comprising titanium dioxide, silica, talc, mica, and aluminium stearate, wherein the polyaniline+dopant comprises greater than 6 wt % of the composition, by weight of the composition.

2. The composition of claim 1, wherein the polyaniline is an emeraldine form of the polyaniline.

3. The composition of claim 1, wherein the composition has a volatile organic content 300 g/L or less.

4. The composition of claim 1, wherein the composition has a volume solids of about 70% or greater, based on the total volume of the composition, as determined by weighing out the ingredients, preparing the composition, and evaporating the solvents.

5. The composition of claim 1, wherein the composition comprises epoxy+amino hardener and/or amido hardener in an amount of about 40 wt % to about 75 wt %, based on the total weight of the composition.

6. The composition of claim 1, wherein the composition comprises one or more epoxies in an amount of about 30 wt % to about 50 wt %, based on the total weight of the composition.

7. The composition of claim 1, wherein the composition comprises amino hardener in an amount of about 12 wt % to about 22 wt %, based on the total weight of the composition.

8. The composition of claim 1, wherein the composition comprises amido hardener in an amount of about 12 wt % to about 22 wt %, based on the total weight of the composition.

9. The composition of claim 1, wherein the epoxy is a bisphenol-A epoxy or bisphenol-F epoxy.

10. The composition of claim 1, wherein the composition comprises polyaniline+dopant in an amount of about 10 wt % to about 60 wt %, based on the total weight of the composition.

11. The composition of claim 1, wherein a molar ratio of dopant to aniline units of a polyaniline is about 0.3:1 to about 1:1.

12. The composition of claim 1, wherein the dopant is a benzoate derived from benzoic acid, methylbenzoic acids, salt(s) thereof, or combination(s) thereof.

13. The composition of claim 1, wherein the dopant is a glycolate selected from glycolate or thioglycolate, salt(s) thereof, or combination(s) thereof.

14. The composition of claim 1, wherein the titanium dioxide is in an amount of about 0.01 wt % to about 10 wt %, based on the total weight of the composition.

15. The composition of claim 1, wherein the talc is in an amount of about 0.01 wt % to about 10 wt %, based on the total weight of the composition.

16. The composition of claim 1, wherein the mica is in an amount of about 0.01 wt % to about 10 wt %, based on the total weight of the composition.

17. The composition of claim 1, wherein the silica is in an amount of about 0.01 wt % to about 10 wt %, based on the total weight of the composition.

18. The composition of claim 1, wherein the aluminium stearate is in an amount of about 0.01 wt % to about 0.5 wt %, based on the total weight of the composition.

19. A substrate comprising the composition of claim 1 disposed thereon.

20. The substrate of claim 19, wherein the composition thereon has a thickness of about 5 µm to about 100 µm.

21. The substrate of claim 20, wherein the composition has a resistance of about $10^4 \Omega/\square$ to about $10^8 \Omega/\square$.

22. The substrate of claim 19, wherein the substrate is a vehicle component selected from an airfoil, an auxiliary power unit, a nose of an aircraft, a fuel tank, a tail cone, a panel, a coated lap joint between two or more panels, a wing-to-fuselage assembly, a structural aircraft composite, a fuselage body-joint, or a wing rib-to-skin joint.

23. The substrate of claim 19, wherein the substrate comprises a metal substrate made of aluminum, aluminum alloy, nickel, iron, iron alloy, steel, titanium, titanium alloy, copper, copper alloy, or combination(s) thereof.

24. The substrate of claim 19, wherein the substrate comprises aluminum, carbon fiber epoxy, fiberglass reinforced polymer, cellulose reinforced phenolic resin, polyimide, glass, poly ether ether ketone, poly ether ketone, polystyrene, polypropylene, polytetrafluoroethylene, or combination(s) thereof.

25. The composition of claim 1, wherein the pigment is in an amount of about 0.01 wt % to about 40 wt %, based on the total weight of the composition.

26. The composition of claim 1, wherein the pigment is in an amount of about 0.01 wt % to about 10 wt %.

27. The substrate of claim 19, wherein the composition disposed thereon has a thickness of about 1 µm to about 10 µm.

28. The substrate of claim 23, wherein the substrate comprises a metal substrate made of aluminum, aluminum alloy, steel, titanium, titanium alloy, copper, copper alloy, or combination(s) thereof.

29. The substrate of claim 28, wherein the substrate comprises a metal substrate made of aluminum, aluminum alloy, or steel.

30. A fiber comprising the composition of claim 1 applied thereon, wherein the fiber is selected from graphite, fiberglass, nylon, or combination(s) thereof.

* * * * *